US006457699B1

(12) United States Patent
Stoecklein

(10) Patent No.: US 6,457,699 B1
(45) Date of Patent: Oct. 1, 2002

(54) VALVE FOR CONTROLLING A LIQUID

(75) Inventor: Wolfgang Stoecklein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/831,226

(22) PCT Filed: Sep. 9, 2000

(86) PCT No.: PCT/DE00/03065

§ 371 (c)(1), (2), (4) Date: May 8, 2001

(87) PCT Pub. No.: WO01/23754

PCT Pub. Date: Apr. 5, 2001

(30) Foreign Application Priority Data

Sep. 30, 1999 (DE) .......................................... 199 46 827

(51) Int. Cl.[7] .................................................. F16K 31/02

(52) U.S. Cl. .............................. 251/129.06; 239/102.2; 239/124

(58) Field of Search .............................. 251/129.06, 57, 251/129.14; 239/102.2, 124, 533.4

(56) References Cited

U.S. PATENT DOCUMENTS

| | | | | |
|---|---|---|---|---|
| 4,995,587 A | * | 2/1991 | Alexius | 251/129.06 |
| 5,058,614 A | * | 10/1991 | Plohberger et al. | 137/1 |
| 6,062,532 A | * | 5/2000 | Gurich et al. | 137/625.65 |
| 6,079,641 A | * | 6/2000 | Shinogle et al. | 239/533.4 |

FOREIGN PATENT DOCUMENTS

| | | |
|---|---|---|
| EP | 0 282 152 A | 9/1988 |
| EP | 0 477 400 A | 4/1992 |
| EP | 0 816 670 A | 1/1998 |

* cited by examiner

*Primary Examiner*—Lesley D. Morris
*Assistant Examiner*—Patrick Buechner
(74) *Attorney, Agent, or Firm*—Michael J. Striker

(57) ABSTRACT

A valve for controlling liquids has a plezoelectric unit (3) for actuating a valve member (2) and has at least one control piston (7) and at least one actuating piston (10) for actuating a valve closing member (13). Between the control piston (7) and the actuating piston (10) is a hydraulic chamber (11), functioning as a hydraulic coupler. A graduated step-up is provided in such a way that the actuating piston (10) is displaceable for a first fraction of its maximum stroke length, and a cross-sectional area (A1) of the actuating piston (10), adjoining the hydraulic chamber (11), and a cross-sectional area (A3) of the sleeve (14) together at maximum correspond to the cross-sectional area (A0) of the control piston (7). A stop (34) for the sleeve (14) in the valve seat direction is provided in the bore (8).

11 Claims, 2 Drawing Sheets

VALVE FOR CONTROLLING A LIQUID

PRIOR ART

Figures 1, 2:
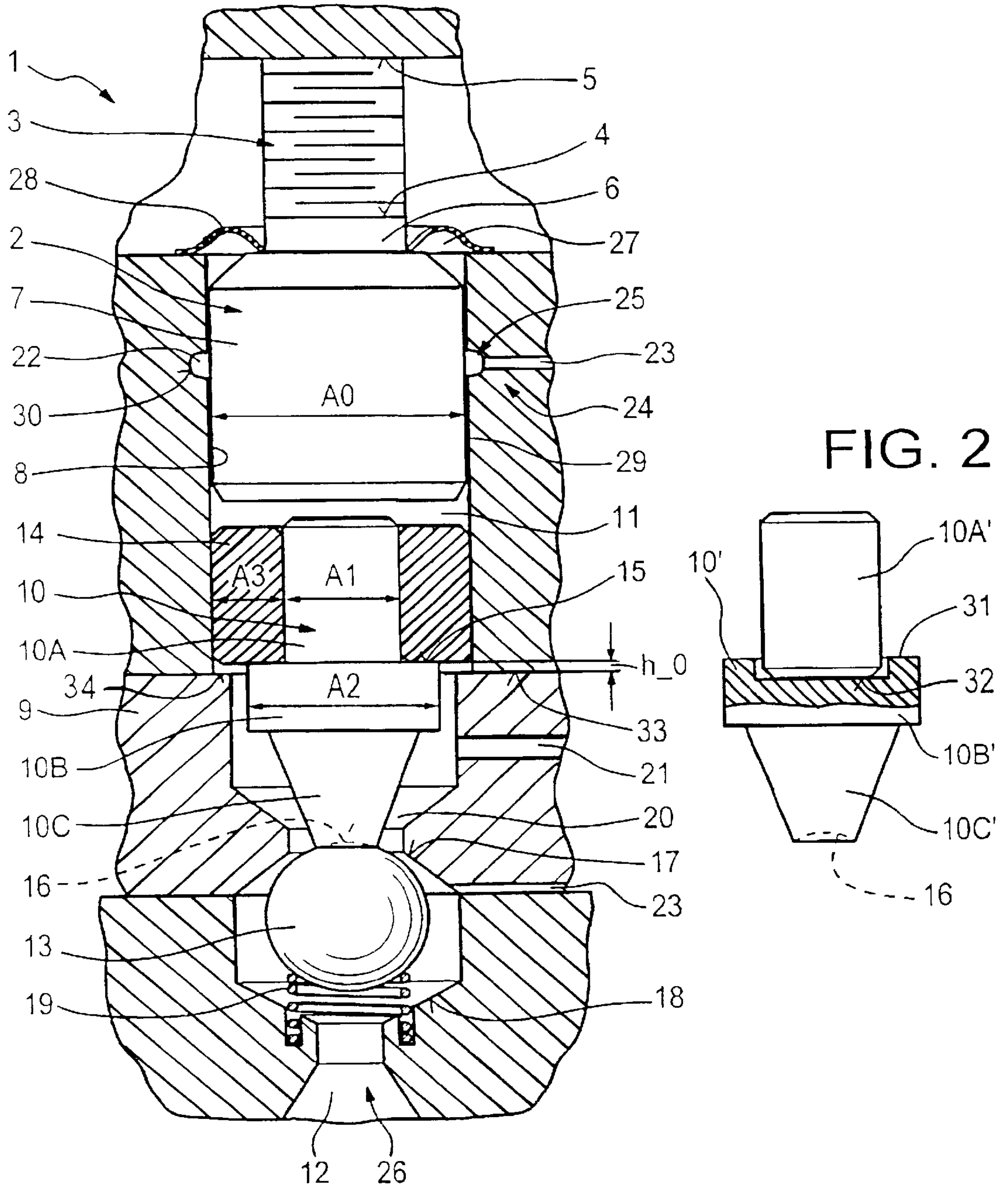

The invention relates to a valve for controlling liquids with a graduated step-up.

From European Patent Disclosure EP 0 477 400 A1, a valve is already known which is actuatable via a piezoelectric actuator. This known valve has an arrangement for an adaptive mechanical tolerance compensation, effective in the stroke direction, for a travel transformer of the piezoelectric actuator, in which the deflection of the piezoelectric actuator is transmitted via a hydraulic chamber.

The hydraulic chamber, which functions as a so-called hydraulic step-up means, encloses a common compensation volume between two pistons defining this chamber, of which one piston is embodied with a smaller diameter and is connected to a valve member to be triggered, and the other piston is embodied with a larger diameter and is connected to the piezoelectric actuator. By way of this compensation volume, tolerances resulting from temperature gradients in the component and possible settling effects can be compensated for without causing any change in position of the valve member to be triggered.

The hydraulic chamber is fastened between the two pistons in such a way that the actuating piston of the valve member executes a stroke that is increased by the step-up ratio of the piston diameter when the larger piston is moved a certain travel distance by the piezoelectric actuator. The valve member, piston and piezoelectric actuator are located one after the other on a common axis.

In the design of such valves, however, it must be taken into account that while the piezoelectric actuator furnishes a large force reserve as long as the actuator stroke is short, nevertheless the maximum stroke of such piezoelectric actuators is also short. By means of a hydraulic or mechanical step-up, the stroke of the actuating piston of a valve closing member can be increased relative to the actuator stroke. However, this reduces the maximum force that the actuator exerts on the valve closing member. This is a great disadvantage, especially in valves that are not force-balanced. Above all, this is true of servo valves for triggering fuel injection valves, embodied as common rail injectors, in which on the one hand a high force for opening the valve and on the other a long valve stroke is desired.

It is the object of the invention to create a valve for controlling liquids with a piezoelectric unit as its actuator system, with which both a great stroke force and a long valve stroke can be achieved.

ADVANTAGES OF THE INVENTION

The valve according to the invention for controlling liquid with a graduated step-up advantageously makes it possible to exert a great force on the valve closing member for a first fraction of the maximum stroke length, since the step-up ratio relative to the control piston is 1:1. Thus the valve dosing member can be opened even counter to a very high pressure. By dimensioning the sleeve surrounding the actuating piston to suit requirements, a long residual stroke length can then be overcome with lesser force.

With a graduated step-up and its simple structural design, the valve is especially well suited as a servo valve for triggering a fuel injection valve for internal combustion engines, and in particular a common rail injector, in which the servo valve must be opened counter to a high rail pressure, and a flow, predetermined by an injection nozzle, through the valve seat of the valve closing member must be achieved with a suitable valve stroke.

With the valve of the invention, the piezoelectric actuator can also be made smaller, since to execute the requisite stroke travel, the maximum actuator force is required for only a short stroke length. Since the dimensioning of the piezoelectric actuator is a significant cost factor, the production costs can additionally be lowered in this way with the valve of the invention.

Further advantages and advantageous features of the subject of the invention can be learned from the specification, drawing and claims.

DRAWING

Figure 3:
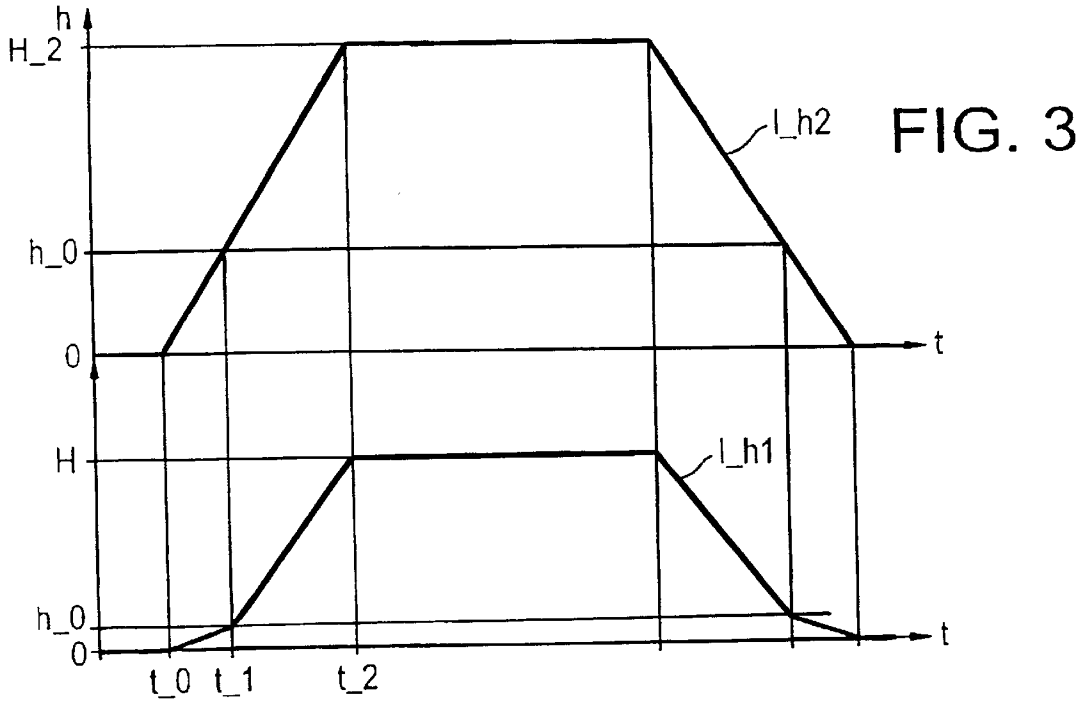
Figure 4:
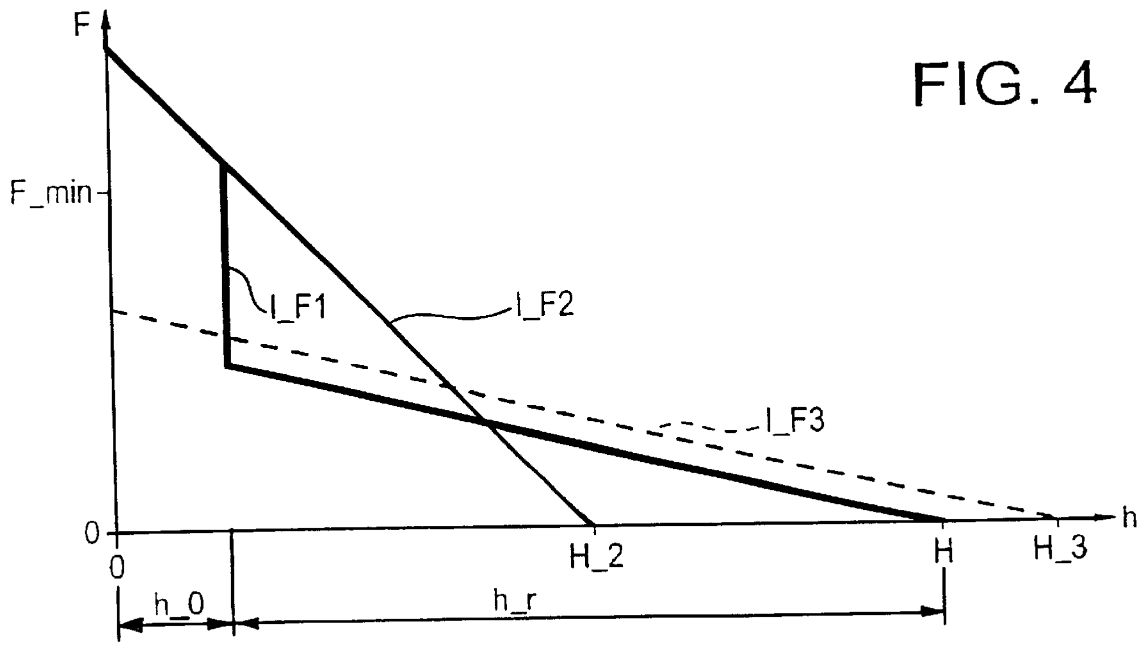

Two exemplary embodiments of the valve of the invention for controlling liquids are shown in the drawing and described in further detail in the ensuing description. Shown are FIG. 1, a schematic, fragmentary view of a first exemplary embodiment of the invention in a fuel injection valve for internal combustion engines, in longitudinal section;

FIG. 2, a schematic view of a second exemplary embodiment, with an alternative actuating piston to FIG. 1, shown by itself;

FIG. 3, a graph in which the valve stroke h is plotted over time t for the valve of the invention, compared to a conventional valve without graduated step-up; and FIG. 4, a graph in which an actuator force F toward the valve is plotted in proportion to the valve stroke h for the valve of the invention, compared to conventional valves without graduated step-up.

DESCRIPTION OF THE EXEMPLARY EMBODIMENTS

The exemplary embodiment shown in FIG. 1 illustrates a use of the valve of the invention in a fuel injection valve 1 for internal combustion engines of motor vehicles. The fuel injection valve 1 is embodied here as a common rail injector, and the injection of diesel fuel is controlled via the pressure level in a valve control chamber 12, which is connected to a high-pressure supply.

For setting an injection onset, injection duration, and injection quantity in the fuel injection valve 1, which in this case is not designed to be force-balanced, a multiple-piece valve member 2 is triggered via a piezoelectric unit embodied as a piezoelectric actuator 3; the piezoelectric actuator 3 is disposed on the side of the valve member 2 opposite of the valve control chamber and the combustion chamber.

The piezoelectric actuator 3, assembled in a known manner from multiple layers, has an actuator head 4 on its side remote from the valve member; the foot is braced on a valve body 9. Via a support 6, a control piston 7 of the valve member 2 rests on the actuator head 4. The valve member 2 is axially displaceable in a bore 8, embodied as a longitudinal bore, of the valve body 9 and includes in addition to the control piston 7 an actuating piston 10 that actuates a valve dosing member 13; the control piston 7 and the actuating piston 10 are coupled to one another by means of hydraulic step-up means.

The hydraulic step-up means is embodied with a hydraulic chamber 11, by way of which the deflection of the piezoelectric actuator 3 is transmitted. To that end, between the two pistons 7 and 10 defining it, of which the actuating piston 10 is embodied with a smaller diameter and the control piston 7 is embodied with a larger diameter, the hydraulic chamber 11 encloses a common compensation volume.

According to the invention, a graduated step-up is provided, to which end the actuating piston 10 is embodied as a stepped piston, which has one region 10A, toward the hydraulic chamber 11, having a first cross-sectional area A1 and another region 10B, adjoining the first region and having a larger, second cross-sectional area A2; the transition to the larger, second cross-sectional area A2 represents a stop 15 for a sleeve 14, by which the actuating piston 10 is surrounded in the bore 8, counter to the valve seat direction. The first, smaller cross-sectional area A1 of the actuating piston 10 and the cross-sectional area A3 of the sleeve 14, which face borders on the hydraulic chamber 11, are equivalent, if gap faces are ignored, to the cross-sectional area A0 of the control piston 7 at the hydraulic chamber 11. A stop 34 for the sleeve 14 in the valve seat direction is also provided in the bore 8; until it is reached, or in other words until a first fraction h_0 of a maximum stroke length H is covered, the actuating piston 10 is displaced together with the sleeve 14, and beyond this stop, the actuating piston 10 executes a remaining stroke length h_r by itself. The stop 34 is preferably embodied as a shoulder on a dividing face 33 of the divided valve body 9 in the bore 8.

The length of the sleeve 14 is selected here to be equal to the length of the region 10A of the actuating piston 10 having the first cross-sectional area A1. The cross section of the actuating piston 10 tapers from its region 10B having Its the second cross-sectional area A2 toward a bearing face 16 for the valve closing member 13.

The valve closing member 13, which is embodied spherically, and which is provided on an end of the valve member 2 toward the valve control chamber, cooperates with valve seats 17, 18 embodied on the valve body 9; a spring 19 which keeps the valve closing member 13 on the upper valve seat 17 when the valve control chamber 12 is relieved is associated with the lower valve seat 18. The valve seats 17. 18 are embodied in a first valve chamber 20, formed by the valve body 9, that communicates with a leak drain conduit 21 and with a compensation conduit 23, leading to a valve system pressure chamber 22, of a filling device 24.

It is understood that it can also be provided, in an alternative version, that the valve closing member 13 cooperate with only one valve seat.

The valve closing member 13 divides a low-pressure region 25 having a system pressure from a high-pressure region 26 having a high pressure or rail pressure. In the high-pressure region 26, of which only the valve control chamber 12 is indicated here, a movable valve control piston (not visible) is disposed. By axial motion of the valve control piston in the valve control chamber 12, which communicates in the usual way with an injection line that in turn communicates with a high-pressure storage chamber (common rail) that is common to a plurality of fuel injection valves and supplies an injection nozzle with fuel, the injection performance of the fuel injection valve 1 is controlled in a manner known per se.

On the end of the valve member 2 toward the piezoelectric actuator, the bore 8 is adjoined by a second valve chamber 27, which is defined on one side by the valve body 9 and on the other by a sealing element 28 that is connected to the control piston 7 and the valve body 9; the sealing element 28, shown only schematically in FIG. 1, is embodied here as a bellowslike diaphragm and prevents the piezoelectric actuator 3 from being able to come into contact with the fuel contained in the low-pressure region 25.

Since the hydraulic chamber 11 must be refilled during an interval between triggering or current supply events for the piezoelectric actuator, the filling device 24, shown only in suggested fashion in FIG. 1, is provided to compensate for a leakage quantity from the low-pressure region 25; by means of the filling device, hydraulic liquid can be carried from the high-pressure region 26 into the low-pressure region 25. As seen in FIG. 1, the conduitlike hollow chamber 23 of the filling device 24 discharges, in an advantageous feature, into a gap 29 surrounding the control piston 7; the discharge region, together with an annular groove 30, forms the system pressure chamber 22. Thus refilling of the hydraulic chamber 11 with fuel, if enough leakage occurs, takes place from the annular groove 30 without any further provision having to be made.

It is understood that still other structural designs of the system pressure chamber are conceivable, but an annular design with an annular groove is advantageous, because in this way uniform filling of the hydraulic chamber 11 is achieved. It is understood that the filling device 24 can have appropriate throttling relative to the high-pressure region 26 and a suitable device for bleeding off any overpressure.

The fuel injection valve 1 of FIG. 1 functions as described below.

FIGS. 3 and 4 serve the purpose of further explanation: FIG. 3 shows the valve stroke h over the time t, and FIG. 4 purely schematically shows the ratio between the actuator force F toward the valve and the valve stroke h in the valve of the invention, compared with conventional valves without graduated step-up.

In the closed state of the fuel injection valve 1, that is, without current being supplied to the piezoelectric actuator 3, the valve closing member 13 of the valve member 2 is kept, by the high pressure or rail pressure in the high-pressure region 26, in contact with the upper valve seat 17, so that no fuel can flow out of the valve control chamber 12, communicating with the common rail, into the valve chamber 20 and then escape through the leak drainage conduit 21.

In the event of a slow actuation, as occurs upon a temperature-dictated change in length of the piezoelectric actuator 3 or other valve components, the control piston 7 as the temperature rises penetrates the compensation volume of the hydraulic chamber 11, and upon a drop in temperature shrinks correspondingly back again, without this having any overall effect on the closing and opening position of the valve member 2 and of the fuel injection valve 1.

For fuel injection through the fuel injection valve 1, the valve closing member 13 must be opened counter to the flow direction and thus counter to the rail pressure in the high-pressure region 26. An actuator force F_min required for opening is the result of the prevailing rail pressure and the diameter of the valve seat 17 or 18 as applicable. The actuator force F for opening the valve closing member 13, which for a valve stroke h equal to 0 is greater than the requisite force F_min, is generated by the piezoelectric actuator 3, which when current is supplied to it suddenly expands axially, and by displacement of the control piston, a certain pressure builds up in the hydraulic chamber 11. Thus via the hydraulic chamber 11, a hydraulic force which is of equal magnitude to the force of the piezoelectric actuator 3 is exerted both on the actuating piston 10 and on the sleeve 14, which in this phase is in contact with the stop 15 of the actuating piston 10. In other words, a step-up ratio of 1:1 prevails, as long as the sleeve 14 is contacting the stop 15.

As a line 1_h1 in FIG. 3 and a line 1_F1 in FIG. 4 show, the actuating piston 10 together with the sleeve 14 contacting the stop 15 moves, within a period of time from time t_0 when the valve closing member 13 lifts from the valve seat 17 until time t__1 when the sleeve 14 meets the stop 34, over a first fraction h__0 of its maximum stroke length H.

From time t__1, at which the sleeve 14 is at the stop 34, a step-up ratio in accordance with the ratio between the cross-sectional area A0 of the control piston 7 and the cross-sectional area A1 of the portion 10A of the actuating piston 10 adjoining the hydraulic chamber 11 prevails for the remaining stroke length h__r. As a result, a long stroke H of the valve can be attained with markedly reduced force.

The valve motion over the time t, which in qualitative terms for the fuel injection valve 1 of the invention is represented by the line l__h1 in FIG. 3, differs from the valve motion of a conventional valve, with a hydraulic or mechanical 1:1 coupling, as represented by a line l__h2, in that the valve speed of conventional valves is low, while the actuator force F is high. This can also be seen in FIG. 4 from a line l__F2 representing such conventional valves. By comparison, in the valve of the invention, the valve speed until the maximum stroke travel H is reached, at a time t__2, is relatively high.

If for the same starting force the stroke length H of the valve of the invention is compared with a maximum stroke H__2, which results in a conventional valve with 1:1 coupling in accordance with the force line l__F2, then it can be that the attainable stroke H of the invention is substantially longer. This means more-stable operation of the fuel injection valve 1, since on the one hand the valve position is unambiguous, and on the other, an outlet throttle—not shown here—that is typical for common rail injectors can reliably cavitate.

A line 1__F3 in FIG. 4 shows the ratio of the actuator force F to the valve stroke h for a conventional valve without graduated step-up, where the ratio between the cross-sectional areas of the control piston and the actuating piston is 2:1. While a very long maximum valve stroke H__3 is attainable here, the initial actuator force F is so slight that it is inadequate to open a valve seat with a large diameter, as in the valve of the invention that makes a high flow possible.

As can be seen from this, with the invention opening of the fuel injection valve 1 at high rail pressures is possible without having to shorten the valve stroke.

In the double seat valve shown in FIG. 1, the valve closing member 13 is stabilized in a middle position between the two valve seats 17, 18 and is then moved into a closing position at the lower valve seat 18, and as a result fuel no longer flows out of the valve control chamber 12 into the first valve chamber 20.

When the supply of current to the piezoelectric actuator 3 is interrupted, the piezoelectric actuator becomes shorter again, and the valve closing member 13 is put into the middle position between the two valve seats 17, 18, and another fuel injection occurs. Through the lower valve seat 18, fuel can get into the valve chamber 20. After the pressure reduction in the valve chamber 20 through the leak drainage conduit 21, the valve closing member 13 moves into its closing position on the upper valve seat 17, and the sleeve 14 is slaved by the stop 15 of the actuating piston 10.

Each time the piezoelectric actuator 3 is triggered, which can be attained by delivering electrical current and withholding electrical current in alternation, fuel injection and any requisite refilling of the hydraulic chamber 11 for the valve 1 of the invention are performed.

With regard to FIG. 2, an actuating piston 10' of a second exemplary embodiment of the fuel injection valve is shown by itself. Compared to the version of FIG. 1, the actuating piston 10' shown here differs in being embodied in two parts; the region 10A' having the first cross-sectional area A1 is a separate component. For receiving the component 10A', a recess 32 is provided on an end face 31, toward this component, of the actuating piston 10'. The region 10B' having the second cross-sectional area A2 and the adjoining, tapering region 10C' correspond in their design to the actuating piston of FIG. 1.

A fuel injection valve having an actuating piston 10' as in FIG. 2, for which production and the pairing of parts with one another are especially simple, otherwise functions in the same way as described for the version of FIG. 1.

Although the exemplary embodiments pertain to fuel injection valves that intrinsically are not force-balanced, it is understood that the invention can also be used in valves designed to be force-balanced, where the fast opening of the valve is advantageous.

Nor is the invention limited to fuel injection valves; it is also suitable for all valves having piezoelectric actuator systems, in which a valve closing member divides a high-pressure region from a low-pressure region, as is the case in pumps, for instance.

What is claimed is:

1. A valve for controlling liquids, having a piezoelectric unit (3) for actuating a valve member (2), which is displaceable in a bore (8) of a valve body (9) and which has at least one control piston (7) and at least actuating piston (10, 10') for actuating a valve closing member (13), which member cooperates with at least one valve seat (17, 18), provided on the valve body (9), for opening and closing the valve (1), and having a hydraulic chamber (11) functioning as a tolerance compensation element and as a hydraulic step-up means, between the control piston (7) and the actuating piston (10, 10'), characterized in that a graduated step-up is provided such that the actuating piston (10, 10') is displaceable in the bore (8), together with a sleeve (14) surrounding it, for a first fraction (h__0) of its maximum stroke length (H), and a first cross-sectional area (A1) of the actuating piston (10, 10'), adjoining the hydraulic chamber (11), and a cross-sectional area (A3) of the sleeve (14) together are equivalent at maximum to the cross-sectional area (A0), adjoining the hydraulic chamber (11), of the control piston (7), and that in the bore (8), a stop (34) for the sleeve (14) in the valve seat direction is provided, upon reaching which the actuating piston (10, 10') executes a remaining stroke length (h__r).

2. The valve of claim 1, characterized in that the actuating piston (10, 10') is embodied as a stepped piston, which has one region (10A, 10A') oriented toward the hydraulic chamber (11) and having the first cross-sectional area (A1) and one region (10B, 10B') adjoining it and having a larger, second cross-sectional area (A2), and the transition to the larger, second cross-sectional area (A2) represents a stop (15) for the sleeve (14) counter to the valve seat direction.

3. The valve off claim 2, characterized in that the length of the sleeve (14) is equivalent to a length of the region (10A, 10A') of the actuating piston (10, 10') having the first cross-sectional area (A1).

4. The valve of claim 2, characterized in that the cross section of the actuating piston (10,10') tapers from its region (10B, 10B') having the second cross-sectional area (A2) onward, counter to a bearing face (16) for the valve closing member (13).

5. The valve of claim 2, characterized in that the actuating piston (10') is embodied in at least two parts, and the region (10A') having the first cross-sectional are (A1) is a separate component.

6. The valve of claim 5, characterized in that a recess (32) for receiving the component (10A') having the first cross-sectional area (A1) is provided on an end face (31) of the actuating piston (10') oriented toward the component (10A') having the first cross-sectional are (A1).

7. The valve of claim 1, characterized in that the stop (34) for the sleeve (14) is embodied as a shoulder in the bore (8) of the valve body (9), preferably at a dividing face (33) of the valve body (9).

8. The valve of claim 1, characterized in that the actuating piston (10, 10') adjoins a first valve chamber (20), in which the at least one seat (17, 18) for the valve closing member (13) is provided, and the valve dosing member (13) divides a low-pressure region (25) in the valve (1) from a high-pressure region (26), and that the control piston (7) is surrounded, in a region adjoining the bore (8) of the valve body (9), by a second valve chamber (27).

9. The valve of claim 8, characterized in that to compensate for a leakage quantity from the low-pressure region (25) by removal of hydraulic liquid from the high-pressure region (26), a filling device (24) is provided, the filling device (24) being embodied in the valve body (9) with a conduitlike hollow chamber (23) which discharges into a system pressure chamber (22, 30) of the low-pressure region (25) surrounding the control piston (7), the discharge region acting as the system pressure chamber (22), and on the high-pressure side preferably discharges into the first valve chamber (20).

10. The valve of claim 1, characterized in that it is embodied as force-imbalanced.

11. The valve of claim 1, characterized by its use as a component of a fuel injection valve for internal combustion engines.

* * * * *